(12) United States Patent
O'Boyle

(10) Patent No.: US 11,333,446 B2
(45) Date of Patent: May 17, 2022

(54) FLEXIBLE SEAL FOR A ROTARY REGENERATIVE PREHEATER

(71) Applicant: ARVOS Ljungstrom LLC, Wellsville, NY (US)

(72) Inventor: Jeffrey O'Boyle, Wellsville, NY (US)

(73) Assignee: ARVOS Ljungstrom LLC, Wellsville, NY (US)

( * ) Notice: Subject to any disclaimer, the term of this patent is extended or adjusted under 35 U.S.C. 154(b) by 0 days.

(21) Appl. No.: 16/395,766

(22) Filed: Apr. 26, 2019

(65) Prior Publication Data

US 2019/0249930 A1    Aug. 15, 2019

Related U.S. Application Data

(60) Division of application No. 15/753,018, filed as application No. PCT/US2016/047318 on Aug. 17, (Continued)

(51) Int. Cl.
*F28D 19/04* (2006.01)
*F23L 15/02* (2006.01)
(Continued)

(52) U.S. Cl.
CPC ........ *F28D 19/047* (2013.01); *F16J 15/3232* (2013.01); *F16J 15/3268* (2013.01);
(Continued)

(58) Field of Classification Search
CPC .. F16J 15/3232; F16J 15/3268; F16J 15/3292; F23L 15/02; F28D 19/047;
(Continued)

(56) References Cited

U.S. PATENT DOCUMENTS 885,032 A * 4/1908 Ferranti ................. F01D 5/225
                                                    415/173.6
1,746,598 A * 2/1930 Ljungström .......... F28D 19/047
                                                    165/9
(Continued)

FOREIGN PATENT DOCUMENTS

DE         2451247 A1    5/1976
GB         2515531 A    12/2014
WO      37/37186 A1    10/1997

*Primary Examiner* — Ljiljana V. Ciric
(74) *Attorney, Agent, or Firm* — Murtha Cullina LLP

(57) ABSTRACT

A seal assembly includes a leaf assembly and a supplemental leaf assembly. The leaf assembly includes a first leaf having a first base section. The first base section defines a first fastening area for securing the first leaf to a diaphragm of the preheater. The first leaf has a first elongate section extending away from the first base section and terminating at a first distal end thereof. The leaf assembly further includes a second leaf that engages a portion of the first leaf. The second leaf has a second base section. The second base section defines a second fastening area for securing the second leaf to the diaphragm. The second leaf has a second elongate section extending away from the second base section and terminating at a second distal end thereof. The supplemental leaf assembly is secured to the first leaf and slidingly engaging the second leaf.

16 Claims, 13 Drawing Sheets

Related U.S. Application Data 2016, now Pat. No. 10,295,273, which is a continuation of application No. 14/829,210, filed on Aug. 18, 2015, now abandoned.

(51) Int. Cl.
*F16J 15/3232* (2016.01)
*F16J 15/3268* (2016.01)
*F16J 15/3292* (2016.01)

(52) U.S. Cl.
CPC ........... *F16J 15/3292* (2013.01); *F23L 15/02* (2013.01); *F28D 19/044* (2013.01); *F28F 2230/00* (2013.01); *Y02E 20/34* (2013.01)

(58) Field of Classification Search
CPC ..... F28D 19/044; F28F 2230/00; F28F 11/02; Y02E 20/34
See application file for complete search history.

(56) References Cited

U.S. PATENT DOCUMENTS

| | | | | |
|---|---|---|---|---|
| 2,233,579 A * | 3/1941 | Bowers | F16J 9/20 | 92/221 |
| 2,560,557 A * | 7/1951 | Curtis | F16J 15/36 | 277/384 |
| 2,571,817 A * | 10/1951 | Armstrong | B65D 88/46 | 48/176 |
| 2,761,654 A * | 9/1956 | Valvo | F28D 19/047 | 165/9 |
| 2,867,462 A * | 1/1959 | Nielsen | F16J 15/324 | 277/555 |
| 3,011,766 A * | 12/1961 | Hess | F28D 19/047 | 165/9 |
| 3,075,781 A * | 1/1963 | Atkinson | E21B 10/25 | 277/322 |
| 3,113,526 A * | 12/1963 | Paschke | F01C 19/10 | 418/61.2 |
| 3,199,878 A * | 8/1965 | Cunningham | F16J 15/3456 | 277/322 |
| 3,399,448 A * | 9/1968 | Jackson | B60J 10/80 | 29/415 |
| 3,505,099 A * | 4/1970 | Neuroth | B29C 66/1122 | 428/447 |
| 3,545,532 A | 12/1970 | Waitkus | | |
| 3,576,328 A * | 4/1971 | Vose | F16J 15/3216 | 277/558 |
| 3,622,436 A * | 11/1971 | Johnson | F28D 19/047 | 428/139 |
| 3,646,993 A * | 3/1972 | Rice | F28D 19/047 | 165/9 |
| 3,666,001 A * | 5/1972 | Johnson | F28D 19/047 | 165/9 |
| 3,692,097 A * | 9/1972 | Penny | F28D 19/047 | 165/9 |
| 3,698,429 A * | 10/1972 | Lowe | F16K 1/165 | 137/601.06 |
| 3,703,206 A * | 11/1972 | Barnard | F28D 19/047 | 165/9 |
| 3,730,538 A * | 5/1973 | Silverstone | F28D 19/047 | 428/556 |
| 3,743,008 A * | 7/1973 | Zeek | F28D 19/047 | 165/9 |
| 3,761,101 A * | 9/1973 | Good | F28D 19/047 | 165/9 |
| 3,805,882 A * | 4/1974 | Vallance | F28D 19/047 | 165/9 |
| 3,843,278 A * | 10/1974 | Torell | F04D 29/526 | 415/173.4 |
| 3,845,545 A * | 11/1974 | Surrall | F28D 19/047 | 228/209 |
| 3,899,182 A * | 8/1975 | Johnson | F28D 19/047 | 277/406 |
| 3,913,926 A * | 10/1975 | Rao | F28D 19/047 | 165/9 |
| 3,928,906 A * | 12/1975 | Good | F28D 19/047 | 29/460 |
| 3,954,135 A * | 5/1976 | Hewlitt | F28D 19/047 | 165/9 |
| 3,970,319 A * | 7/1976 | Carroll | F01D 11/12 | 277/414 |
| 4,071,076 A * | 1/1978 | Sakaki | F28D 19/047 | 165/9 |
| 4,073,337 A * | 2/1978 | Stockman | F28D 19/047 | 165/9 |
| 4,098,323 A * | 7/1978 | Wiegard | F28D 19/047 | 165/9 |
| 4,114,248 A * | 9/1978 | Smith | F02K 1/805 | 29/460 |
| 4,149,587 A | 4/1979 | Stockman | | |
| 4,202,554 A * | 5/1980 | Snell | F16J 15/3288 | 277/355 |
| 4,226,429 A * | 10/1980 | Sato | F16J 15/3496 | 165/9 |
| 4,251,986 A * | 2/1981 | Thompson | F16J 15/54 | 60/797 |
| 4,358,120 A * | 11/1982 | Moore | F16J 15/3288 | 277/355 |
| 4,593,750 A * | 6/1986 | Finnemore | F28D 19/047 | 165/9 |
| 4,645,217 A * | 2/1987 | Honeycutt, Jr | F01D 11/005 | 277/555 |
| 4,673,026 A * | 6/1987 | Hagar | F28D 19/047 | 165/7 |
| 4,678,113 A * | 7/1987 | Bridges | A46D 1/08 | 228/160 |
| 4,791,980 A * | 12/1988 | Hagar | F28D 19/047 | 165/9 |
| 4,940,080 A * | 7/1990 | Reeves | F28D 19/047 | 165/9 |
| 4,997,028 A * | 3/1991 | Townsend | F28D 19/047 | 165/8 |
| 5,031,922 A * | 7/1991 | Heydrich | F16J 15/3288 | 277/355 |
| 5,042,823 A * | 8/1991 | Mackay | F01D 11/02 | 277/355 |
| 5,071,138 A * | 12/1991 | Mackay | F16J 15/3284 | 277/303 |
| 5,076,590 A * | 12/1991 | Steinetz | F02K 1/805 | 277/355 |
| 5,108,116 A * | 4/1992 | Johnson | F16J 15/3288 | 277/355 |
| 5,145,011 A * | 9/1992 | Seike | F28D 19/047 | 165/9 |
| 5,181,728 A * | 1/1993 | Stec | F01D 11/005 | 277/355 |
| 5,222,692 A * | 6/1993 | Glowacki | F01D 11/005 | 244/53 R |
| 5,234,048 A | 8/1993 | Seike et al. | | |
| 5,316,072 A * | 5/1994 | Seike | C09K 3/1003 | 165/9 |
| 5,363,903 A | 11/1994 | Hagar | | |
| 5,401,036 A * | 3/1995 | Basu | F16J 15/3288 | 277/355 |
| 5,425,543 A * | 6/1995 | Buckshaw | F16J 15/3288 | 165/9 |
| 5,509,669 A * | 4/1996 | Wolfe | F01D 11/005 | 277/654 |
| 5,540,274 A | 7/1996 | Slocum et al. | | |
| 5,542,684 A * | 8/1996 | Squirrell | F16K 1/2266 | 277/411 |
| 5,560,198 A * | 10/1996 | Brewer | F02K 1/80 | 60/766 |
| 5,586,773 A * | 12/1996 | Bagepalli | F01D 11/005 | 277/650 |
| 5,655,594 A | 8/1997 | Wonderling | | |
| 5,657,998 A * | 8/1997 | Dine | F01D 11/005 | 277/653 |

(56) References Cited

U.S. PATENT DOCUMENTS

| | | | | |
|---|---|---|---|---|
| 5,697,619 A * | 12/1997 | Fierle | F28D 19/047 | 277/345 |
| 5,706,648 A * | 1/1998 | Porte | F02C 7/28 | 244/54 |
| 5,755,445 A * | 5/1998 | Arora | F01D 11/005 | 277/418 |
| 5,803,157 A | 9/1998 | Brophy et al. | | |
| 5,881,799 A * | 3/1999 | Kozacka | F23L 15/02 | 165/9 |
| 5,897,120 A * | 4/1999 | Scavo | F16J 15/122 | 277/628 |
| 5,911,271 A | 6/1999 | Fierle et al. | | |
| 5,913,359 A | 6/1999 | Milligan et al. | | |
| 5,950,707 A * | 9/1999 | Kozacka | F28D 17/023 | 165/9 |
| 6,364,316 B1 * | 4/2002 | Arora | F16J 15/3288 | 277/355 |
| 6,505,837 B1 * | 1/2003 | Heshmat | F01D 11/025 | 277/411 |
| 6,599,089 B2 * | 7/2003 | Aksit | F02C 7/28 | 415/191 |
| 6,609,885 B2 * | 8/2003 | Mohammed-Fakir | F16J 15/0812 | 415/191 |
| 6,702,295 B1 * | 3/2004 | Kapcoe | F16J 15/3228 | 277/551 |
| 6,789,605 B1 | 9/2004 | Kaser | | |
| 6,805,356 B2 * | 10/2004 | Inoue | F16J 15/3292 | 277/355 |
| 6,811,154 B2 * | 11/2004 | Proctor | F16J 15/164 | 277/355 |
| 7,093,837 B2 * | 8/2006 | Parker | F23R 3/60 | 277/630 |
| 7,201,378 B2 * | 4/2007 | Kono | F16J 15/3292 | 277/355 |
| 7,231,958 B1 * | 6/2007 | Kaser | F23L 15/02 | 165/9 |
| 7,367,567 B2 * | 5/2008 | Farah | F01D 11/003 | 277/650 |
| 7,578,509 B2 * | 8/2009 | Grondahl | F16J 15/3292 | 277/355 |
| 7,703,774 B2 * | 4/2010 | Awtar | F01D 11/02 | 277/412 |
| 8,157,266 B2 * | 4/2012 | Klisura | F28D 19/047 | 277/355 |
| 8,322,976 B2 * | 12/2012 | Chila | F01D 9/023 | 415/135 |
| 8,505,923 B2 * | 8/2013 | Ferryman | F16J 15/3288 | 277/355 |
| 8,596,973 B2 * | 12/2013 | Grondahl | F16J 15/3292 | 415/231 |
| 8,776,864 B2 * | 7/2014 | Klisura | F23L 15/02 | 165/9 |
| 8,806,750 B2 * | 8/2014 | Hurtado | F16J 15/3224 | 29/890.034 |
| 8,985,592 B2 * | 3/2015 | Green | F01D 9/023 | 277/637 |
| 9,347,330 B2 * | 5/2016 | Chuong | F01D 11/003 | |
| 9,435,266 B2 * | 9/2016 | Sutterfield | F16J 15/104 | |
| 9,562,478 B2 * | 2/2017 | Chuong | F01D 25/162 | |
| 9,845,695 B2 * | 12/2017 | Budnick | F02C 7/28 | |
| 9,903,216 B2 * | 2/2018 | Chuong | F01D 11/003 | |
| 9,957,827 B2 * | 5/2018 | Davis | F16J 15/104 | |
| 9,964,214 B2 * | 5/2018 | Burd | F01D 11/12 | |
| 10,138,742 B2 * | 11/2018 | Budnick | F02C 7/28 | |
| 10,145,256 B2 * | 12/2018 | Ratajac | F02C 7/25 | |
| 10,161,523 B2 * | 12/2018 | Sarawate | F01D 11/006 | |
| 10,295,273 B2 * | 5/2019 | O'Boyle | F16J 15/3232 | |
| 10,364,748 B2 * | 7/2019 | Teixeira | F02C 7/28 | |
| 10,533,664 B1 * | 1/2020 | Hastings | F16J 15/3268 | |
| 10,704,840 B2 * | 7/2020 | O'Boyle | F16J 15/3232 | |
| 11,162,590 B2 * | 11/2021 | Crudu | F16J 15/3236 | |
| 2003/0025274 A1 * | 2/2003 | Allan | F01D 11/005 | 277/355 |
| 2003/0042682 A1 * | 3/2003 | Inoue | F16J 15/3288 | 277/355 |
| 2003/0062684 A1 * | 4/2003 | Inoue | F16J 15/3268 | 277/355 |
| 2003/0062685 A1 * | 4/2003 | Inoue | F16J 15/3292 | 277/355 |
| 2003/0197333 A1 | 10/2003 | Zakel et al. | | |
| 2005/0046113 A1 * | 3/2005 | Inoue | F16J 15/3288 | 277/355 |
| 2007/0138750 A1 * | 6/2007 | Warnecke | F16J 15/14 | 277/549 |
| 2009/0145574 A1 * | 6/2009 | Klisura | F28D 19/047 | 165/8 |
| 2011/0036536 A1 * | 2/2011 | Klisura | F23L 15/02 | 165/9 |
| 2011/0037236 A1 * | 2/2011 | Klisura | F28D 19/047 | 277/650 |
| 2013/0270777 A1 * | 10/2013 | Clouse | F01D 25/246 | 277/637 |
| 2013/0327495 A1 * | 12/2013 | Hastings | F23L 15/02 | 165/9 |
| 2017/0051983 A1 * | 2/2017 | O'Boyle | F16J 15/3268 | |
| 2018/0245859 A1 * | 8/2018 | O'Boyle | F28D 19/047 | |
| 2019/0212069 A1 * | 7/2019 | O'Boyle | F16J 15/3268 | |
| 2019/0249930 A1 * | 8/2019 | O'Boyle | F28D 19/047 | |

* cited by examiner to the heat transfer assembly 1000 mounted in the compartments 20. The heated heat transfer assembly 1000 is rotated into the air sector 32 of the preheater 10. Heat stored in the heat transfer assembly 1000 is then transferred to the combustion air stream 38 entering through the air inlet duct 26.
FLEXIBLE SEAL FOR A ROTARY REGENERATIVE PREHEATER

CROSS REFERENCE TO RELATED APPLICATIONS

This application is a divisional application of, and claims priority to, co-pending U.S. patent application Ser. No. 15/753,018, filed on Feb. 2, 2018 which is a national stage application of PCT Application No. PCT/US2016/047318, filed Aug. 17, 2016, which was a continuation application of U.S. patent application Ser. No. 14/829,210, filed on Aug. 18, 2015. The entireties of the aforementioned applications are incorporated by reference herein.

TECHNICAL FIELD

This invention relates to a flexible seal for a rotary regenerative preheater, and more particularly to a flexible seal having multiple leaves.

BACKGROUND

As shown in FIG. 1, a rotary regenerative air preheater (hereinafter referred to as the "preheater") is generally designated by the numeral 10. The preheater 10 includes a rotor assembly 12 rotatably mounted on a rotor post 16. The rotor assembly 12 is positioned in and rotates relative to a housing 14. For example, the rotor assembly 12 is rotatable about an axis A of the rotor post 16 in the direction indicated by the arrow R. The rotor assembly 12 includes partitions 18 (e.g., diaphragms) extending radially from the rotor post 16 to an outer periphery of the rotor assembly 12. Adjacent pairs of the partitions 18 define respective compartments 20 for receiving a heat transfer assembly 1000. Each of the heat transfer assemblies 1000 include a plurality of heat transfer sheets 100 and/or 200 stacked upon one another.

As shown in FIG. 1, preheater 10 is a bisector configuration in which the housing 14 includes a flue gas inlet duct 22 and a flue gas outlet duct 24 for channeling the flow of heated flue gases through the preheater 10. The housing 14 further includes an air inlet duct 26 and an air outlet duct 28 for channeling the flow of combustion air through the preheater 10. The preheater 10 includes an upper sector plate 30A extending across the housing 14 adjacent to an upper face of the rotor assembly 12. The preheater 10 includes a lower sector plate 30B extending across the housing 14 adjacent to lower face of the rotor assembly 12. The upper sector plate 30A extends between and is joined to the flue gas inlet duct 22 and the air outlet duct 28. The lower sector plate 30B extends between and is joined to the flue gas outlet duct 24 and the air inlet duct 26. The upper and lower sector plates 30A and 30B, respectively, are joined to one another by a circumferential plate 30C. The upper sector plate 30A and the lower sector plate 30B divide the preheater 10 into an air sector 32 and a gas sector 34.

As illustrated in FIG. 1, the arrows marked 'A' indicate the direction of a flue gas stream 36 through the gas sector 34 of the rotor assembly 12. The arrows marked 'B' indicate the direction of a combustion air stream 38 through the air sector 32 of the rotor assembly 12. The flue gas stream 36 enters through the flue gas inlet duct 22 and transfers heat to the heat transfer assembly 1000 mounted in the compartments 20. The heated heat transfer assembly 1000 is rotated into the air sector 32 of the preheater 10. Heat stored in the heat transfer assembly 1000 is then transferred to the combustion air stream 38 entering through the air inlet duct 26. Thus, the heat absorbed from the hot flue gas stream 36 entering into the preheater 10 is utilized for heating the heat transfer assemblies 1000, which in turn heats the combustion air stream 38 entering the preheater 10.

As shown in FIG. 2, a prior art seal 40 extends axially from (i.e., parallel to the axis A) and radially along an edge of each of the diaphragms 18 towards the sector plate 30A. Another seal 40 extends axially from and radially along an opposite side of each of the diaphragms 18 towards the sector plate 30B (only one seal 40 shown in FIG. 1). The seal 40 typically includes a flexible seal leaf 42 having a base portion 42B that is positioned between an L-shaped backing bar 43 and an elongate holding bar 41. A base portion 41B of the holding bar 41, the base portion 42B of the flexible seal 42 and a base portion 43B of the backing bar 43 are secured by a plurality of bolts 45 and nuts 46 between a spacer bar 44 and the diaphragm 18, radially along a length of the diaphragm 18.

During operation of the preheater 10, a surface 31' of the sector plates 30A and 30B is spaced apart from a distal end of the seal 40. However, during start-up conditions when the preheater 10 and ducts 22, 24, 26 and 28 are relatively cold, the surface 31 of the sector plates 30A and 30B slidingly engage the respective seal 40. Such sliding engagement causes the flexible seal leaf 42 to wear and results in bypass leakage between the air sector 32 and the gas sector 34. In addition, through laboratory testing, the inventors have surprisingly found that such sliding engagement of the seal 40 with the respective sector plate 30A and 30B results in oscillatory vibration of the seal 40, as indicated by the arrow V, causing fatigue failure thereof. In addition, the inventors have discovered that because the seal 40 is mounted on a leading edge of the diaphragm 18, the edge of the diaphragm 18 acts as an abrupt fulcrum 47 upon which the seal 40 is bent over and causes stress concentrations at the mating portion of the seal 40. Such stress concentrations cause premature failure of the seal 40.

In addition, International Publication No. WO 97/37186 A1 discloses an arrangement in an air preheater for maintaining a controlled gap between a flexible sealing member and a sector plate at full load operating conditions to reduce leakage and sealing surface wear; and to provide a means to eliminating gapping between the sealing surface and the flexible sealing member in an air preheater due to deflection caused by gas pressure differentials, means for preventing premature failure due to edge fracturing of the flexible sealing member, and means for eliminating gaps between adjacent segments of the flexible sealing member.

Japanese Patent Application No. S59 231396 A discloses a front plate is detachably attached to an upper selector plate. An elastic thin plate sealing member is detachably attached on a back portion of the front plate 6. The back plate is detachably attached on the back portion of the elastic thin plate sealing member so that the deformation curvature of the elastic thin plate sealing member is limited.

U.S. Patent Application Publication No. US 2013/105105 A1 discloses a bimetallic seal for an air heater to flex and close a gap as the temperature changes using a laminated metal/bimetallic seal that deflects to provide a seal to control leakage.

SUMMARY OF THE INVENTION

There is disclosed herein a seal assembly for a rotary preheater. The seal assembly includes a leaf assembly and a supplemental leaf assembly. The leaf assembly includes a first leaf having a first base section. The first base section defines a first fastening area for securing the first leaf to a diaphragm of the preheater. The first leaf has a first elongate section extending away from the first base section and terminating at a first distal end thereof. The leaf assembly further includes a second leaf that engages a portion of the first leaf. The second leaf has a second base section. The second base section defines a second fastening area for securing the second leaf to the diaphragm. The second leaf has a second elongate section extending away from the second base section and terminating at a second distal end thereof. The supplemental leaf assembly is secured to the first leaf and slidingly engaging the second leaf.

In one embodiment, the second distal end of the second leaf terminates between the first distal end and the first base section of the first leaf.

In one embodiment, the supplemental leaf assembly includes a spacer secured to the first leaf and a third leaf secured to the spacer, for example by one or more rivets or spot welds. The third leaf slidingly engages the second leaf.

In one embodiment, the second distal end of the second leaf terminates between the first distal end and the first base section; the supplemental leaf assembly includes a spacer secured to the first leaf and a third leaf secured to the spacer, the third leaf slidingly engages the second leaf; and the spacer is positioned between the first leaf and the third leaf, the spacer is spaced apart from the second distal end thereby defining a gap between the spacer and the second distal end to accommodate movement of the spacer relative to the second distal end.

In one embodiment, the seal assembly includes one or more displacement members. Each of the displacement members has a first engagement portion configured to displace a portion of the leaf assembly a predetermined distance. In one embodiment, the each of displacement members has an L-shaped configuration defining a first leg and a second leg. The first leg defines a third base portion that is secured to the diaphragm and the second leg has the engagement portion thereon. The displacement members are arranged to establish a predefined contour of the leaf assembly. The predetermined contour is configured to compensate for movement of the preheater during operation.

In one embodiment, the seal assembly incudes a strip (e.g., guard and/or limiter) having fourth base section engaging the second base section such that the second base section is positioned between the first base section and the fourth base section. The strip defines a deflector section extending away from the fourth base section and away from the second leaf. In one embodiment, the seal assembly includes one or more wear resistant members secured to the first leaf and/or at least a portion of the supplemental leaf assembly. The wear resistant members have a wear resistant material (e.g., powder coating, hardfacing weldment of the like) applied thereto.

There is also disclosed herein a preheater assembly. The preheater assembly includes a rotor assembly rotatably mounted on a rotor post and disposed in a housing. The rotor assembly defines diaphragms extending radially from the rotor post to an outer periphery of the rotor assembly. Adjacent pairs of the diaphragms define respective compartments for receiving a heat transfer assembly. Each of the heat transfer assemblies include a plurality of heat transfer sheets stacked upon one another. The housing including a flue gas inlet duct and a flue gas outlet duct for channeling the flow of heated flue gases through the preheater The housing also includes an air inlet duct and an air outlet duct for channeling the flow of combustion air through the preheater. The preheater includes an upper sector plate extending across the housing adjacent to an upper face of the rotor assembly and a lower sector plate extending across the housing adjacent to the lower face of the rotor assembly. The upper sector plate extends between and is joined to the flue gas inlet duct and the air outlet duct; and the lower sector plate extends between and is joined to the flue gas outlet duct and the air inlet duct. The upper and lower sector plates, respectively, are joined to one another by a circumferential plate. The upper sector plate and/or the lower sector plate define a leading edge and a trailing edge. One or more of the leading edge and the trailing edge defines a ramped configuration. A seal assembly is positioned on an axial edge of each diaphragm. The seal assembly includes a leaf assembly and a supplemental leaf assembly. The leaf assembly includes a first leaf having a first base section. The first base section defines a first fastening area for securing the first leaf to a diaphragm of the preheater. The first leaf has a first elongate section extending away from the first base section and terminating at a first distal end thereof. The leaf assembly further includes a second leaf that engages a portion of the first leaf. The second leaf has a second base section. The second base section defines a second fastening area for securing the second leaf to the diaphragm. The second leaf has a second elongate section extending away from the second base section and terminating at a second distal end thereof. The supplemental leaf assembly is secured to the first leaf and slidingly engages the second leaf. A portion of the first leaf slidingly engages the leading edge and disengages the trailing edge.

In one embodiment, the second distal end terminates between the first distal end and the first base section.

In one embodiment, the supplemental leaf assembly includes a spacer secured to the first leaf and a third leaf secured to the spacer. The third leaf slidingly engages the second leaf.

There is also disclosed herein another seal assembly. The other seal assembly includes one or more leaves that have a base section. The base section defines a fastening area for securing the leaf to a diaphragm of the preheater. The leaf has an elongate section extending away from the base section and terminating at a distal end thereof. At least one wear resistant member is secured to the leaf proximate to a distal end thereof. The wear resistant members have a wear resistant material applied thereto.

DETAILED DESCRIPTION

Figure 3:
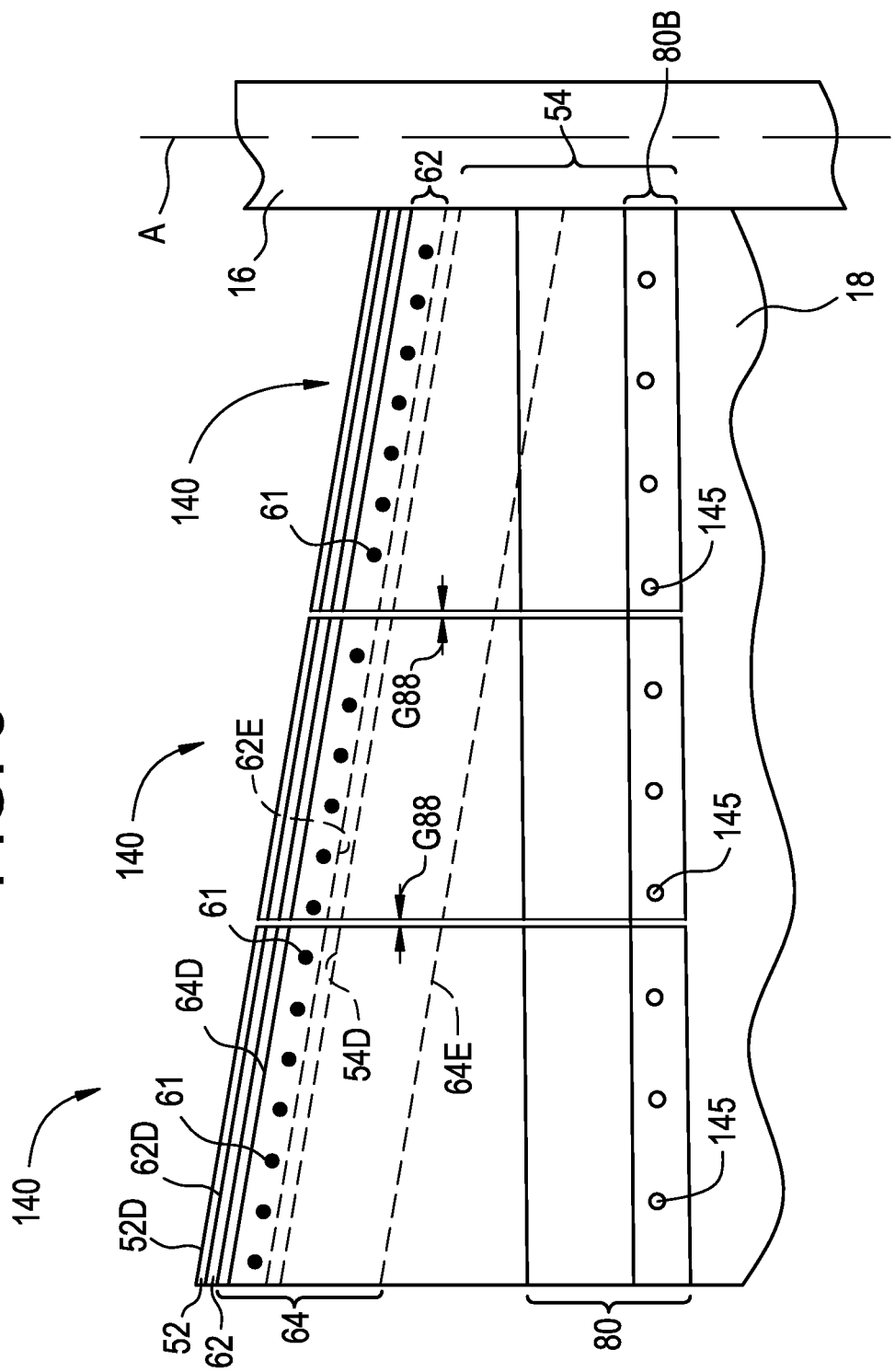
FIG. 3 is a plan view of the seal assembly of the present invention viewed from a trailing side of the diaphragm.
Figure 4:
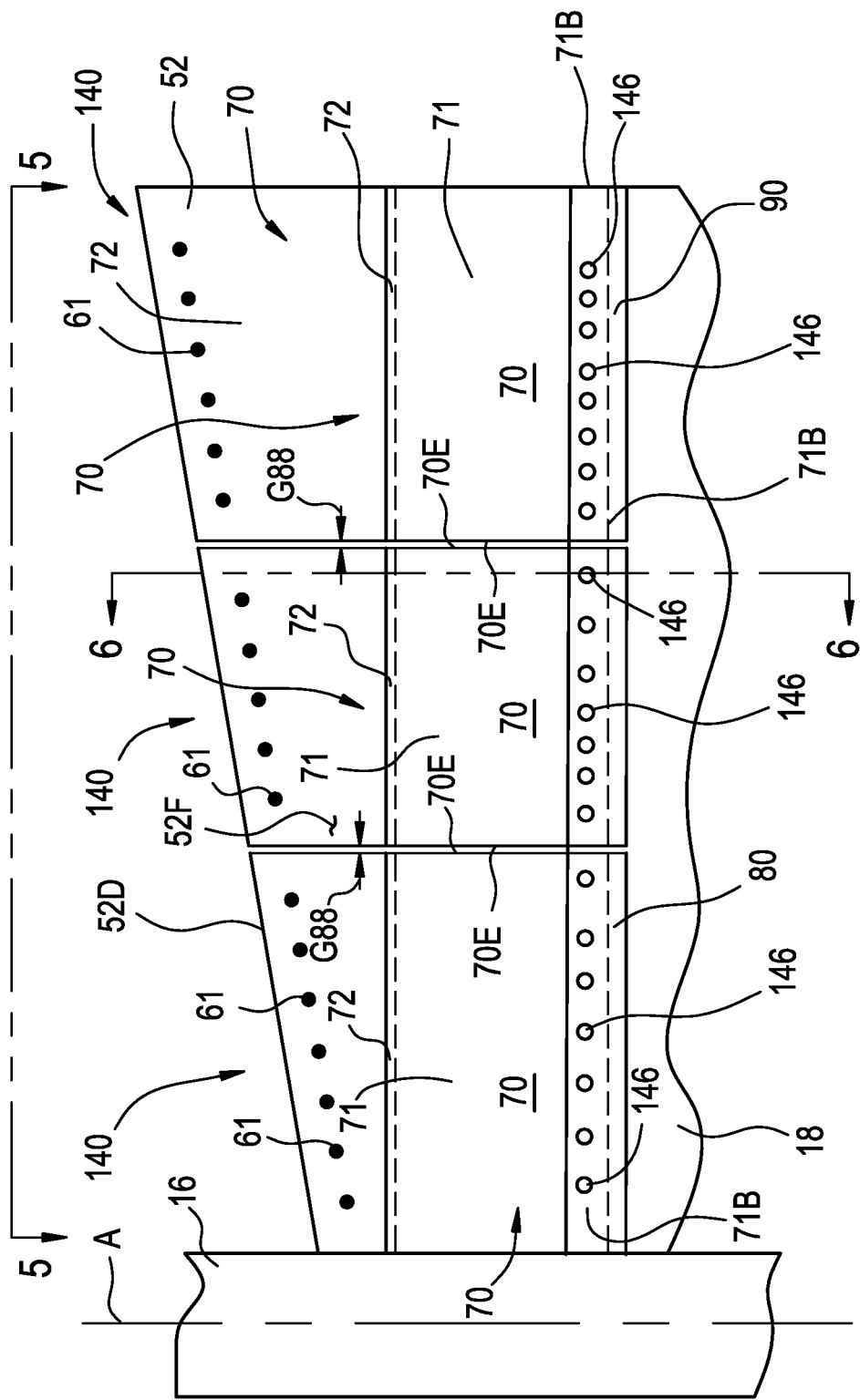
FIG. 4 is a plan view of the seal assembly of the present invention viewed from a leading side of the diaphragm.
Figure 5:
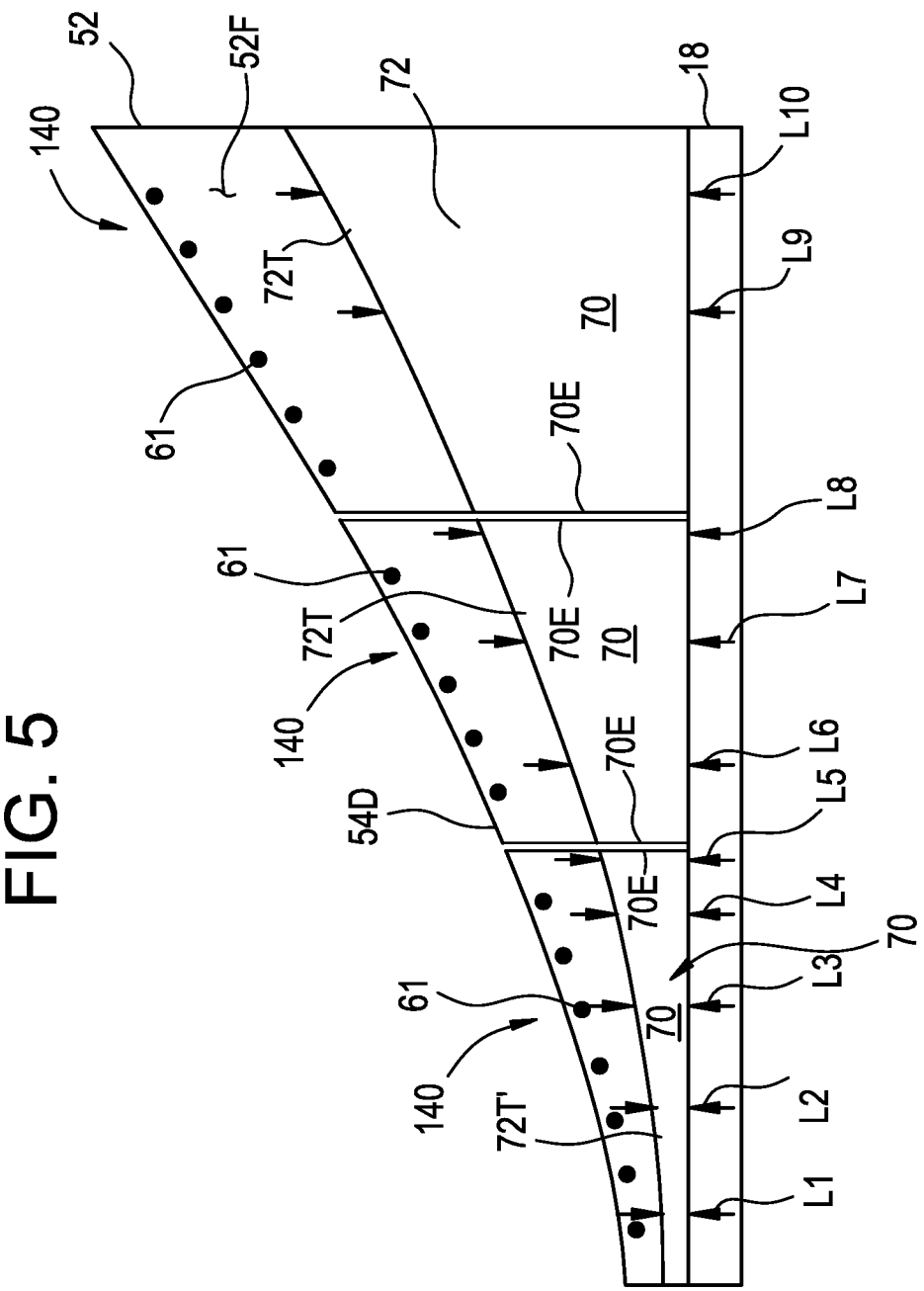
FIG. 5 is a top view of the seal assembly of FIG. 4 taken across line 5-5 of FIG. 4.
Figure 6:
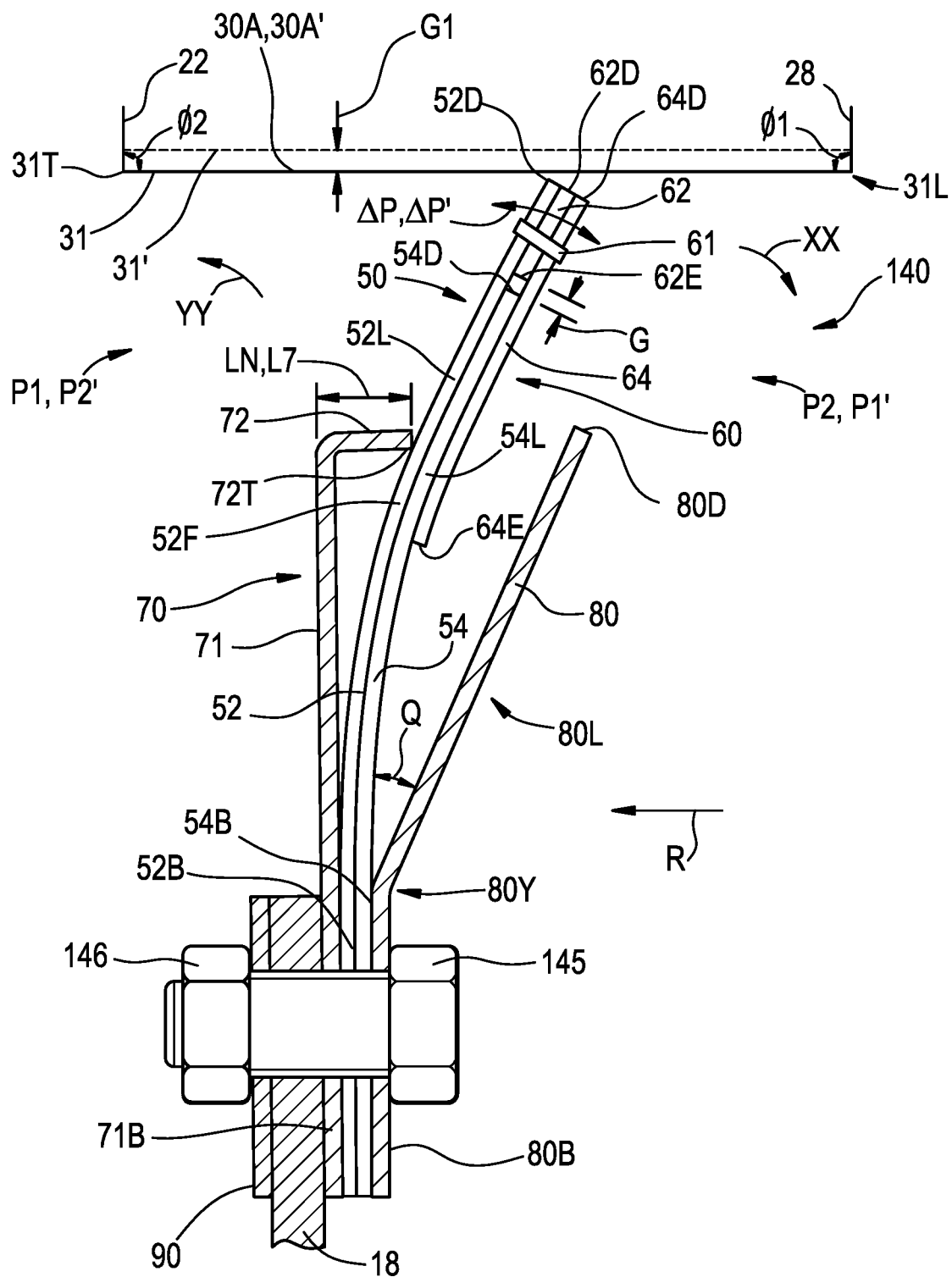
FIG. 6 is a cross sectional view of the seal assembly of FIG. 3 taken across line 6-6 of FIG. 4.

As shown in FIG. 6, a seal assembly of the present invention is generally designated by the numeral 140. As shown in FIGS. 3-5 three of the seal assemblies 140 are secured, in a radially segmented configuration, to opposing axially edges of each of the diaphragms 18 of the bisector type preheater of FIG. 1 by a suitable fastener system such as a plurality of bolts 145 and nuts 146. However, other methods of fastening the seal assemblies 140 to the diaphragms 18 may be employed such as but not limited to welding and brazing. Each of the seal assemblies 140 are a generally elongate member that extends between the rotor post 16 and a radially outward peripheral edge of the diaphragm 18, as shown in FIGS. 3 and 4. While the seal assembly 140 is described as being employed in a bisector type preheater, the present invention is not limited in this regard as the seal assembly may be employed in a tri-sector or quad sector preheater, without departing from the broader aspects disclosed herein.

Referring to FIG. 6, each of the seal assemblies 140 includes a leaf assembly 50 having a first leaf 52 having a first base section 52B. The first base section 52B defines a first fastening area, for example, a flat section and a bore extending therethrough for receiving one of the bolts 145 for securing the first leaf 52 to the diaphragm 18 of the preheater 10 of FIG. 1. The first leaf 52 has a first elongate section 52L extending away from the first base section 52B and terminating at a first distal end 52D thereof.

Referring to FIG. 6, each of the seal assemblies 140 includes a second leaf 54 engaging a portion of the first leaf 52 and having a second base section 54B. The second base section 54B defines a second fastening area, for example, a flat section and a bore extending therethrough for receiving one of the bolts 145 for securing the second leaf 54 to the diaphragm 18 of the preheater 10 of FIG. 1. The second leaf 54 has a second elongate section 54L extending away from the second base section 54B and terminating at a second distal end 54D thereof. The second distal end 54D terminates along a length of the first leaf 52 between the first distal end 52D and the first base section 52B of the first leaf 52.

Figure 10:
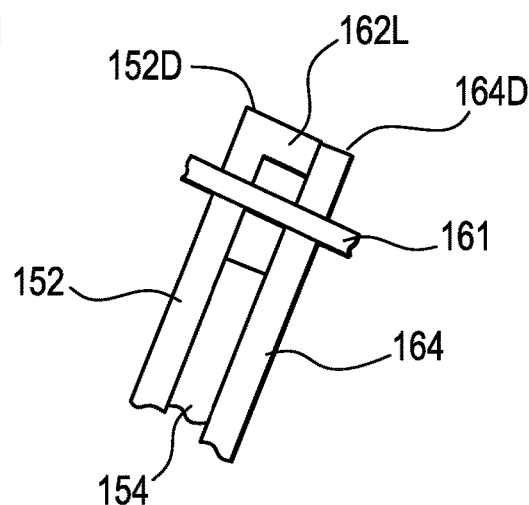
FIG. 10 is a cross sectional view of a portion of another embodiment of the seal assembly of FIG. 6 wherein the spacer is formed by a bend in a first leaf.
Figure 11:
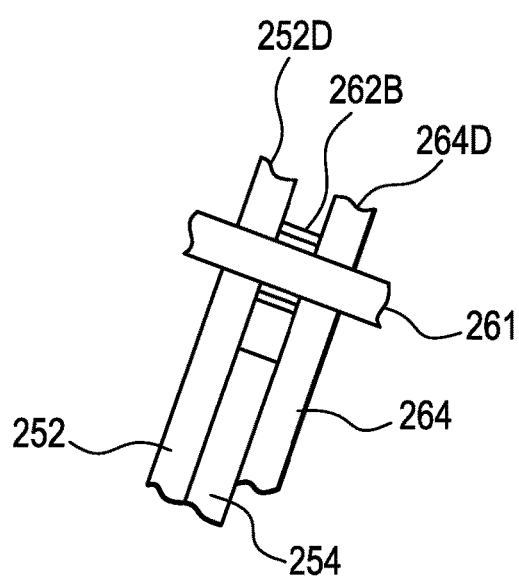
FIG. 11 is a cross sectional view of a portion of another embodiment of the seal assembly of FIG. 6 wherein the spacer is formed by rivets and spacer rings.
Figure 12:
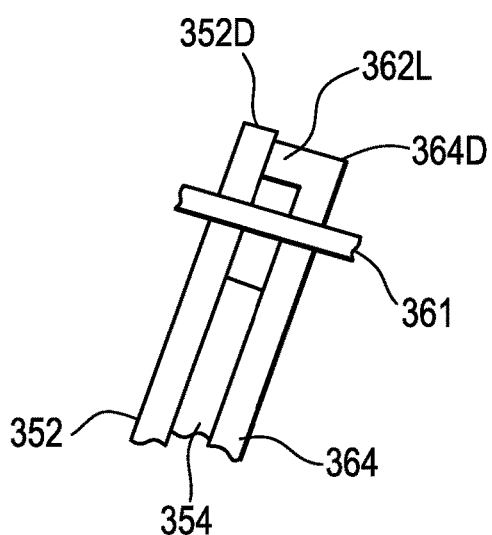
FIG. 12 is a cross sectional view of a portion of another embodiment of the seal assembly of FIG. 6 wherein the spacer is formed by a bend in a second leaf.

As shown in FIG. 6, each of the seal assemblies 140 includes a supplemental leaf assembly 60 secured to (e.g., via suitable fastening structures 61 such as rivets or spot welds) the first leaf 52 and slidingly engages the second leaf 54. The supplemental leaf assembly 60 includes a spacer 62 (e.g., a spacer leaf) secured to (e.g., via the fastening structures 61) the first leaf 52. The spacer 62 defines a distal end 62D. The supplemental leaf assembly 60 includes a third leaf 64 secured to (e.g., via the fastening structures 61) the spacer 62. The third leaf 64 slidingly engages a portion of the second leaf 54. The third leaf 64 defines a third distal end 64D. The spacer 62 is positioned between the first leaf 52 and the third leaf 64. The spacer 62 is spaced apart from the second distal end 54D thereby defining a gap G between the spacer 62 and the second distal end 54D to accommodate movement of the spacer 62 relative to the second distal end 54D. While the spacer 62 is described and shown in FIG. 6 as being a leaf, the present invention is not limited in this regard as other spacer configurations may be employed including but not limited to: 1) a spacer 162L formed as a leg as a result of a bend 152D in the first leaf 152 as shown in FIG. 10; 2) a spacer ring 262B disposed around a rivet 261 and positioned between the first leaf 252 and a third leaf 264 as shown in FIGS. 11; and 3) a spacer 362L formed as a leg as a result of a bend 364D in the third leaf 364 as shown in FIG. 12. The inventors have surprisingly discovered that the sliding engagement of the third leaf 64 with the portion of the second leaf 54 increases the performance and life of the seal assembly 140 by reducing vibrations compared to prior art single leaf seals or improvements with only two leaves.

As shown in FIG. 6, in one embodiment the distal ends 52D, 62D and 64D are aligned with one another. In the configuration shown in FIG. 6, the distal end 52D of the first leaf 52 is shown slidingly engaging the surface 31 of the sector plate 30A during reduced (e.g., 30 percent load or less) or zero load operation. Another of the spacers 62 of a seal assembly 140, positioned on an opposite side of the diaphragm 18, slidingly engages the surface 31 of the sector plate 30B. For loads greater than 30 percent the distal end 54D is spaced apart from the surface 31' of the sector plate 30A by a gap G1 that reduces hot end radial seal gap by fifty percent at full load compared to the prior art seal assemblies 40.

Figure 9:
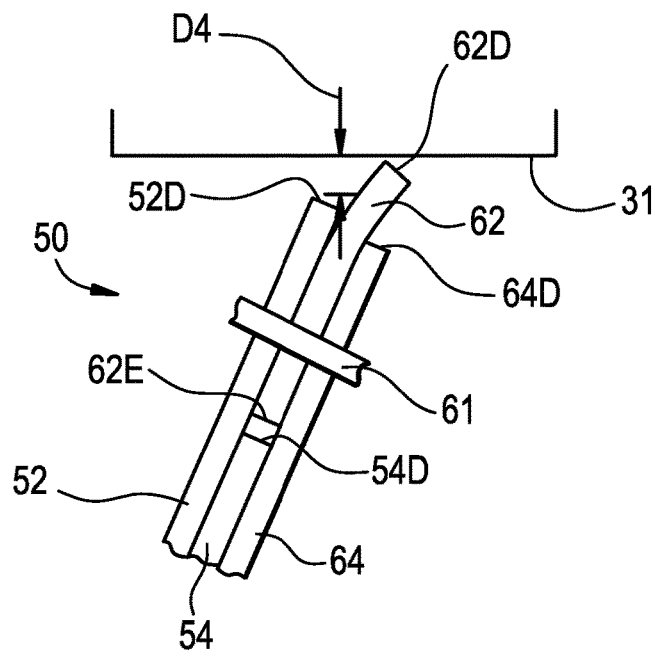
FIG. 9 is a cross sectional view of a portion of another embodiment of the seal assembly of FIG. 6 and having one leaf extending outwardly from the other leaves.

While in FIG. 6 the distal ends 52D, 62D and 64D are aligned with one another, the present invention is not limited in this regard as one or more of the distal ends 52D, 62D and 64D may extend outwardly from one another, as shown in FIG. 9 wherein the distal end 62D extends outwardly from the distal ends 52D and 64D. In one embodiment portions of the spacer 62 on and adjacent to the distal end 62 D are formed of a wear resistant configuration, such as, but not limited to a surface hardfacing weld overlay (e.g., a cobalt based weld material), a case hardened layer (e.g., nitriding, carburizing or other diffusion type hardening) and a precipitation hardened material. The spacer 62 slidingly engages the surface 31 of the sector plate 30A.

In one embodiment, the first leaf 52, the second leaf 54, the third leaf 62 and/or the fourth leaf 64 are manufactured from an austenitic stainless steel, for example a 301 stainless steel. In one embodiment the first leaf 52, the second leaf 54, the third leaf 62 and/or the fourth leaf 64 are about 0.02 to 0.025 inches thick.

As shown in FIGS. 3-5, three of the seal assemblies 140 are shown secured to the diaphragm 18 in a radially segmented configuration and are spaced apart from one another by gaps G88. However, the present invention is not limited in this regard as any number of seal assemblies 140 may be employed and spaced apart from one another by the gaps G88.

As shown in FIG. 4, each of the seal assemblies 140 includes a displacement member 70 having side edges 70E that are spaced apart from one another by the gap G88. While three displacement members 70 are shown, the present invention is not limited in this regard as the displacement members 70 may be formed in one integral piece or any number of segments to facilitate installation. In one embodiment illustrated in FIG. 6, each of the plurality of displacement members 70 has an L-shaped configuration defining a first leg 71 and a second leg 72. The first leg defines a third base section 71B. The third base section 71B defines a third fastening area, for example, a flat section and a bore extending therethrough for receiving one of the bolts 145 for securing the displacement member 70 to the diaphragm 18 of the preheater 10 of FIG. 1.

As shown in FIG. 5, each of second legs 72 defines an engagement portion 72T configured to engage a surface 52F of the first leaf 52 and to displace a portion of the leaf assembly 50 a predetermined distance, as described further herein. Each of the engagement portions 72T has a contoured edge configuration. For example, the engagement portion 72T of the two radially outwardly positioned displacement members 70 have a linear tapered edge; and the engagement portion 72T' of the radially inner most positioned displacement member 70 has an arcuate edge that is complementary in shape to the surface 52F of the first leaf 52. However, any of the displacement members 70 may employ an arcuate edge and/or a linear tapered edge.

As shown in FIG. 6 the second leg 72 has a length LN (e.g., L7 shown in FIG. 6, L1-L10 shown in FIG. 5) extending between the first leg 71 and the engagement portion 72T. As shown in FIG. 5 each of L1-L10 are of a different length and displace the leaf assembly 50 a different magnitude. For example, the lengths L1-L10 progressively increase (i.e., L10 is greater than L9, L9 is greater than L8, L8 is greater than L7, L7 is greater than L6, L6 is greater than L5, L5 is greater than L4, L4 is greater than L3, L3 is greater than L2, L2 is greater than L1). The displacement members 70 are arranged to establish a predefined contour of the leaf assembly 50. The predetermined contour is configured to compensate for movement of the preheater 10 during operation. As shown in FIG. 3, the first leaf 52 and the second leaf 54 have a trapezoidal shape.

Figure 1:
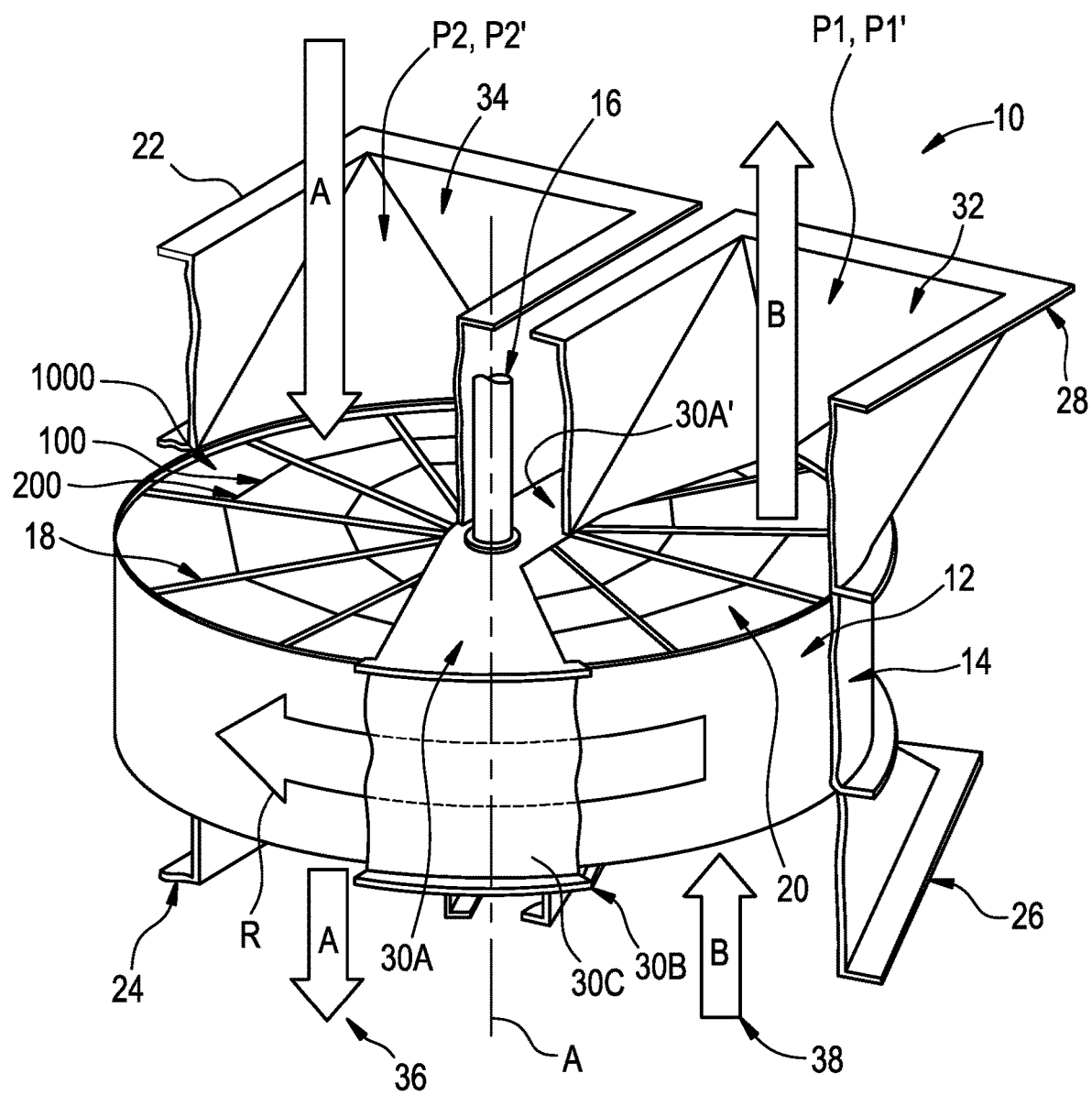
FIG. 1 is a perspective view of a preheater shown in a partial cut away view.

Referring to FIG. 6, when the distal end 52D of the seal assembly 140 engages the surface 31 of the sector plate 30A' a pressure P1 (shown on a left hand side of the leaf assembly 50 in FIG. 6) is present in the air outlet duct 28 of the air sector 32 of FIG. 1; and a pressure P2 (shown on a right hand side of the leaf assembly in FIG. 6) is present in the flue gas inlet duct 22 of the gas sector 34 of FIG. 1. The pressure P1 is greater than the pressure P2, thereby creating a pressure differential ΔP across the seal assembly 140. When the seal assembly 140 is in the area of the sector plate 30A', without the displacement members 70 properly set, the differential pressure ΔP causes the leaf assembly 50 to deflect in the direction indicated by the arrow XX tending to open up a leakage gap between the distal end 52D of the seal assembly 140 and the surface 31 of the sector plate 30A'. However, the displacement members 70 apply a preload or predetermined deflection to the leaf assembly 50 so that the leaf assembly remains in a generally upright position with the distal end 52D of the seal assembly 140 engaging the surface 31 of the sector plate 30A' and thereby overcoming the differential pressure ΔP induced deflection.

When the seal assembly rotates about 180 degrees into the area of the sector plate 30A a pressure P1' (shown on a right hand side of the leaf assembly 50 in FIG. 6) is present in the air outlet duct 28 of the air sector 32 of FIG. 1; and a pressure P2' (shown on a left hand side of the leaf assembly in FIG. 6) is present in the flue gas inlet duct 22 of the gas sector 34 of FIG. 1. The pressure P1' is greater than the pressure P2' thereby creating a differential pressure ΔP' across the leaf assembly 50. When the seal assembly 140 is in the area of the sector plate 30A the differential pressure ΔP' tends to cause the leaf assembly 50 to deflect in the direction indicated by the arrow YY. When the seal assembly 140 is in the area of the sector plate 30A the displacement members 70 hold the leaf assembly 50 in a predetermined position in which the distal end 52D of the seal assembly 140 engages the surface 31 of the sector plate 30A to minimize leakage between the air sector 32 and the gas sector 34.

As shown in FIGS. 3 and 6, each of the seal assemblies 140 includes a strip 80 having a fourth base section 80B that engages the second base section 54B of the second leaf 54. The fourth base section 80B defines a fourth fastening area, for example, a flat section and a bore extending therethrough for receiving one of the bolts 145 for securing each of the strips 80 to the diaphragm 18 of the preheater 10 of FIG. 1. The second base section 54B is positioned between the first base section 52B and the fourth base section 80B. The strip 80 defines a deflector section 80L extending away from the fourth base section 80B and away from the second leaf 54. The deflector section 80L terminates at a distal end 80D. For example, the strip 80 has a bend 80Y so that the deflector section 80L is set at an angle Q away from the second leaf 54. The strip 80 has utility in protecting the leaf assembly 50 from potential obstructions such as soot blowing equipment projecting into the preheater 10. In addition, the strip 80 is a limit stop for limiting the amount of deflection of the leaf assembly 50.

As shown in FIGS. 4 and 6 each of the seal assemblies 140 has a bar 90 (e.g., a spacer bar, or elongate washer) that is aligned with a portion of the first base section 52B and the second base section 54B. The bar 90 extends along a length of the leaf assembly 50 and is positioned between the nuts 146 and the diaphragm 18. The bar 90 provides structural stability and helps uniformly secure the first leaf 52, second leaf 54 and the strip 80 to the diaphragm 18.

As shown in FIG. 6, the sector plate 31 defines a sharp leading edge 31L and a sharp trailing edge 31T. The leading edge 31L is defined by an angle Ø1; and the trailing edge 31T is defined by an angle Ø2. In one embodiment, the angle Ø1 and/or the angle Ø2 is about 90 degrees.

Through analysis and experimentation, the inventors have surprisingly discovered that as the seal assembly 50 rotates with the rotor assembly 12, the first distal end 52D of the first leaf 52 abruptly and scrapingly engages the leading edge 31L in a scissor-like operation; and abruptly and scrapingly disengages the trailing edge 31T in the scissor-like operation, which causes premature wear of the seal. Contrary to engineering intuition, the inventors have found that the wear is more prominent radially inward towards the rotor post 16.

Figure 7:
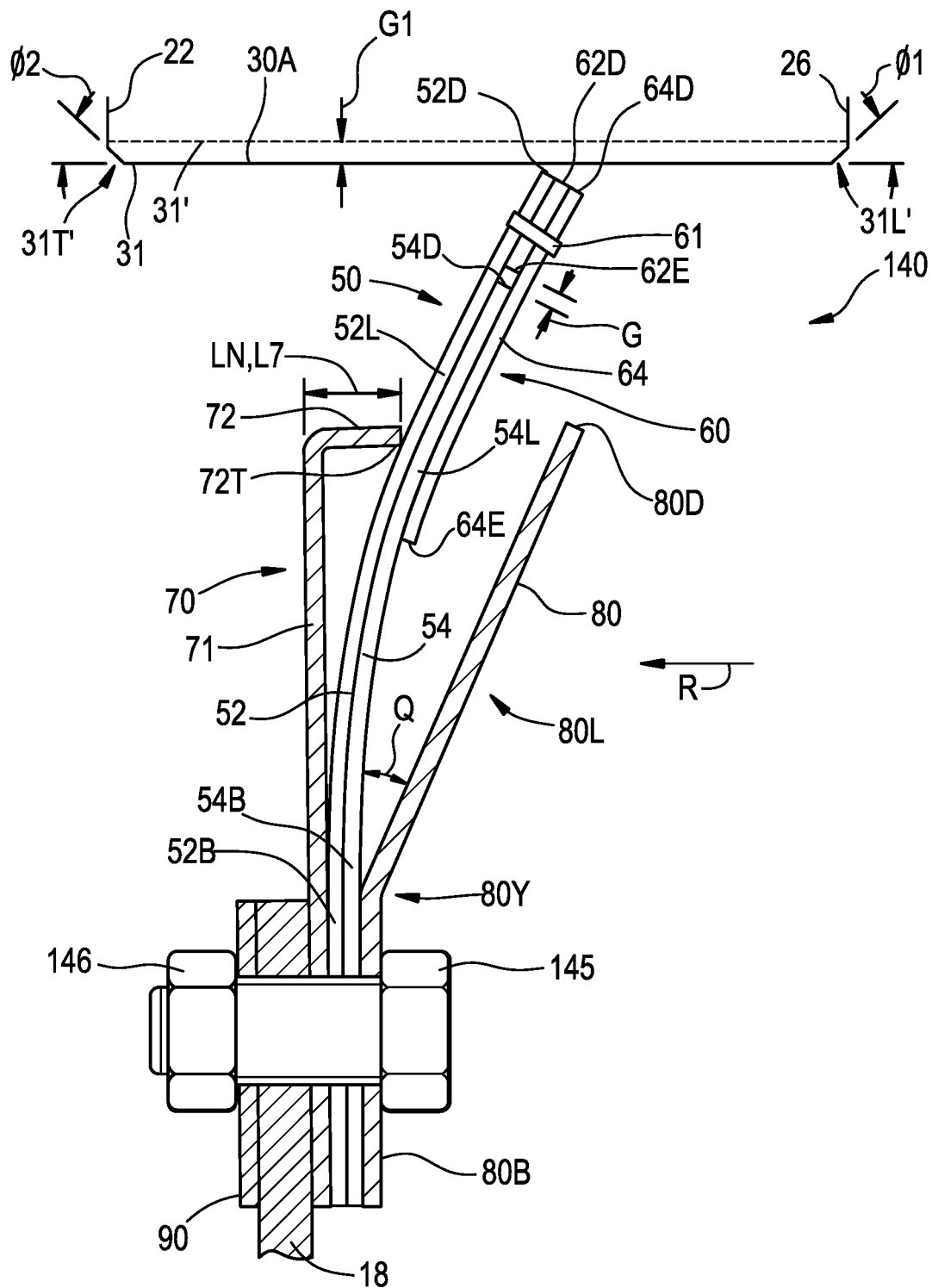
FIG. 7 is another embodiment of the seal assembly of FIG. 6 shown with a sector plate having a ramped configuration.
Figure 8:
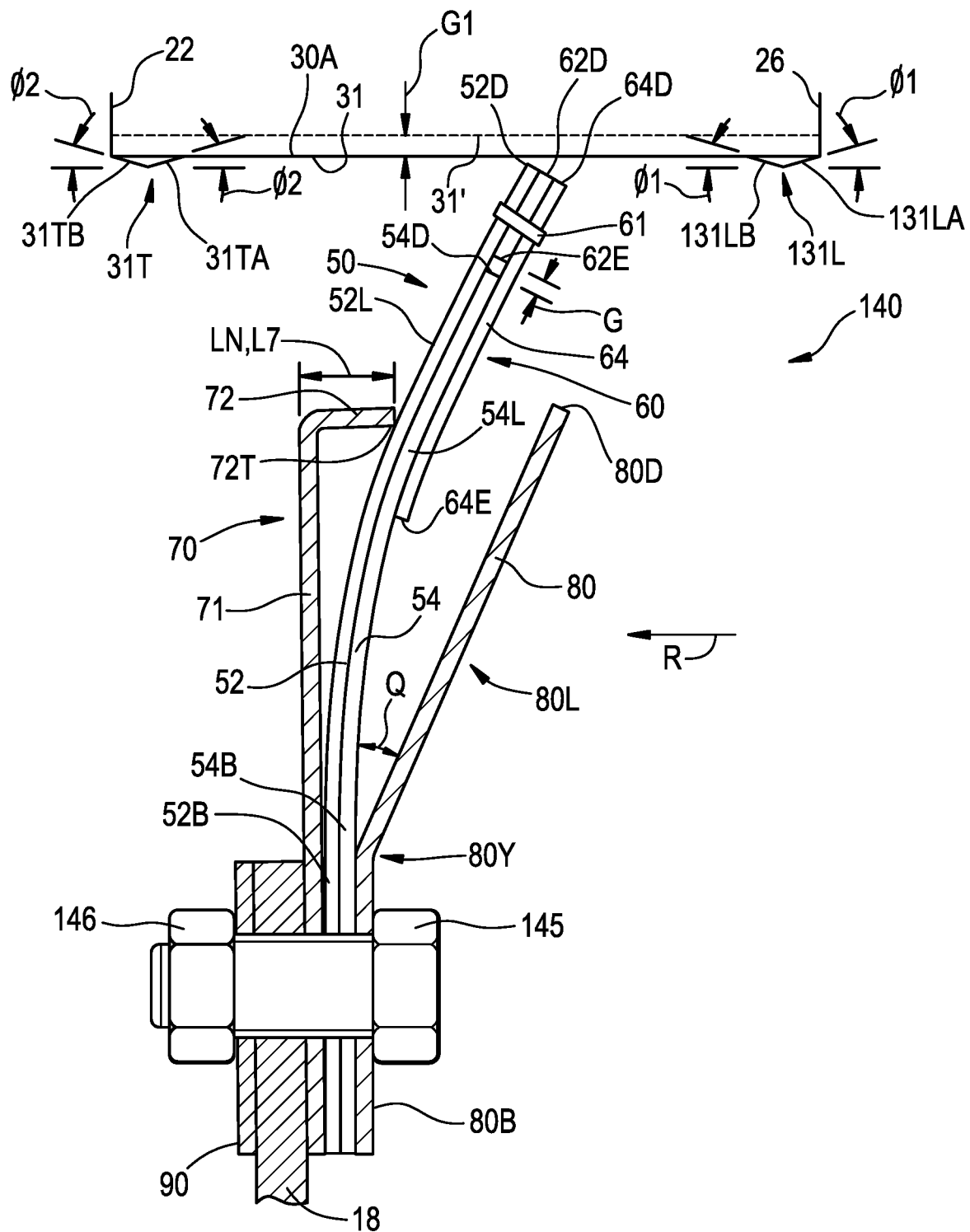
FIG. 8 is another embodiment of the seal assembly of FIG. 7 wherein the ramped configuration includes a ramp attachment secured to each of the leading and trailing edges of the sector plates.

As prompted by the results of the experimentation and testing, the inventors have modified the sharp leading edge 31L and trailing edge 31T to a ramped configuration as shown in FIG. 7. The ramped configuration includes a ramped leading edge 31L' and a ramped trailing edge 31T'. The ramped leading edge 31L' defines a ramp angle θ1, and the ramped trailing edge defines a ramp angle θ2. In one embodiment the ramp angles θ1 and/or θ2 are between about 15 and 25 degrees relative to the surface 31 of the sector plate 30A or 30B. In one embodiment the ramp angles θ1 and/or θ2 are between about 25 and 45 degrees relative to the surface 31 of the sector plate 30A or 30B. While the ramped leading edge 31L' and the ramped trailing edge 31T' is shown as a chamfer in the sector plate 30A the present invention is not limited in this regard as similar configurations may be employed in the sector plate 30B (or other sector plates in tri-sector and quad sector preheaters) and/or other ramp configurations may be employed such as but not limited to ramp attachments 131L and 131T secured to the sector plate 30A and/or 30B as shown in FIG. 8. As shown in FIG. 8, the ramp attachment 131L has a leading surface 131LA and a trailing surface 131LB each oriented at a ramp angle θ1 relative to the surface 31 of the sector plate 30A. Likewise, the ramp attachment 131T has a leading surface 131TA and a trailing surface 131TB each oriented at a ramp angle θ2 relative to the surface 31 of the sector plate 30A. The ramp attachments 131L and 131T are secured to the sector plates 30A and/or 30B by a suitable fastening configuration such as but not limited to bolting and welding. The ramp attachments 131L and 131T are configured to be installed as original equipment as part of a new preheater installation or retrofitting of an existing preheater.

As a result of laboratory test simulations of preheater operation, the inventors have found that the ramped configuration having a 20 degree ramp angle results in a total wear rate of the seal assembly 50 of less than 0.0016 inches per hour at less than 30 percent load operation at locations along the seal assembly between 50 and 150 inches from the axis A; and less than $4\times10^{-4}$ inches per hour at less than 30 percent load operation at locations along the seal assembly radially outward of 150 inches from the axis A. While the wear rates are based upon laboratory testing, the inventors expect that they are a reasonable prediction of wear during operation.

Figure 13:
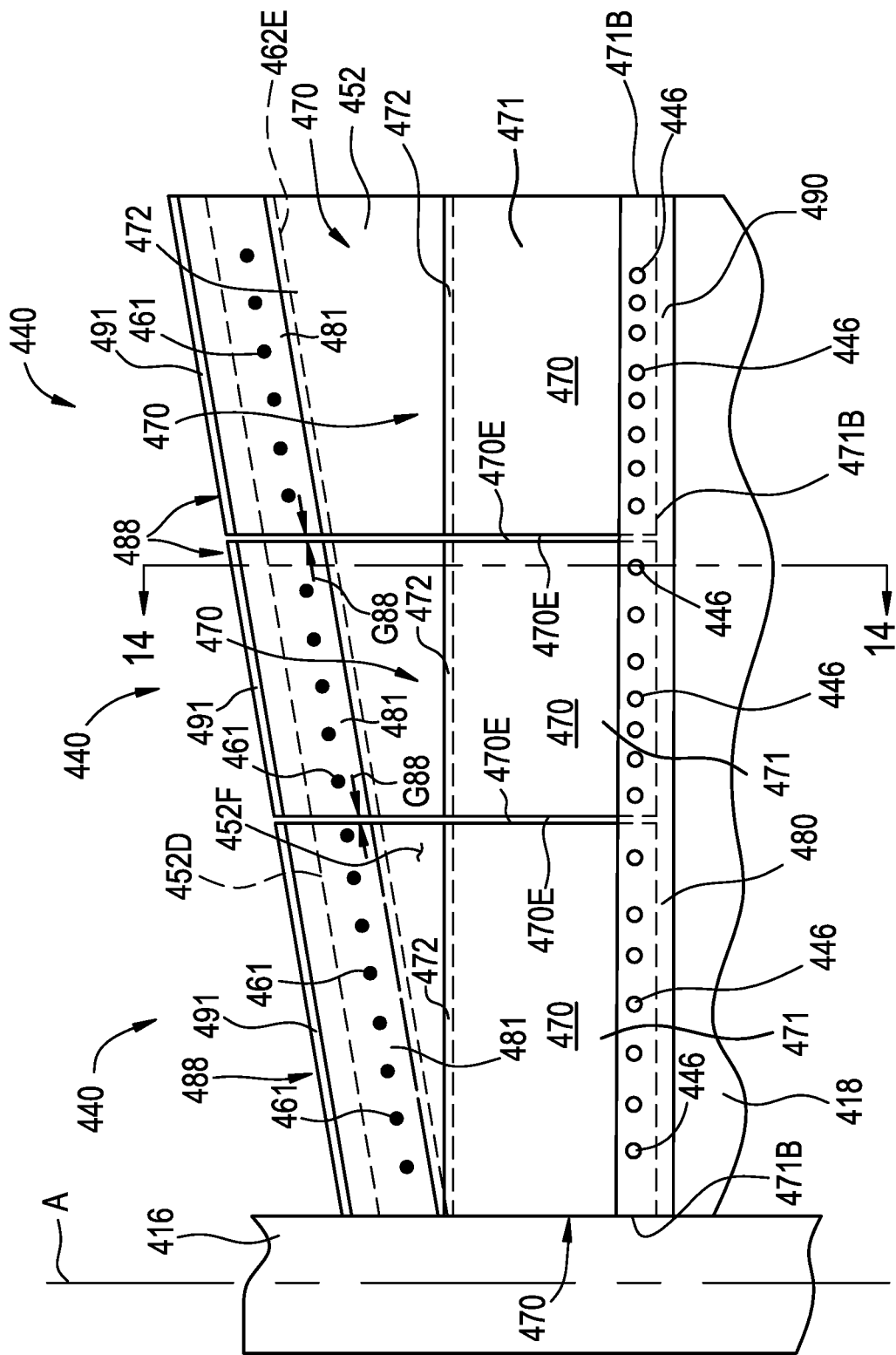
FIG. 13 is a plan view of the seal assembly of the present invention with a wear tip and wear coating, viewed from a leading side of the diaphragm.
Figure 14:
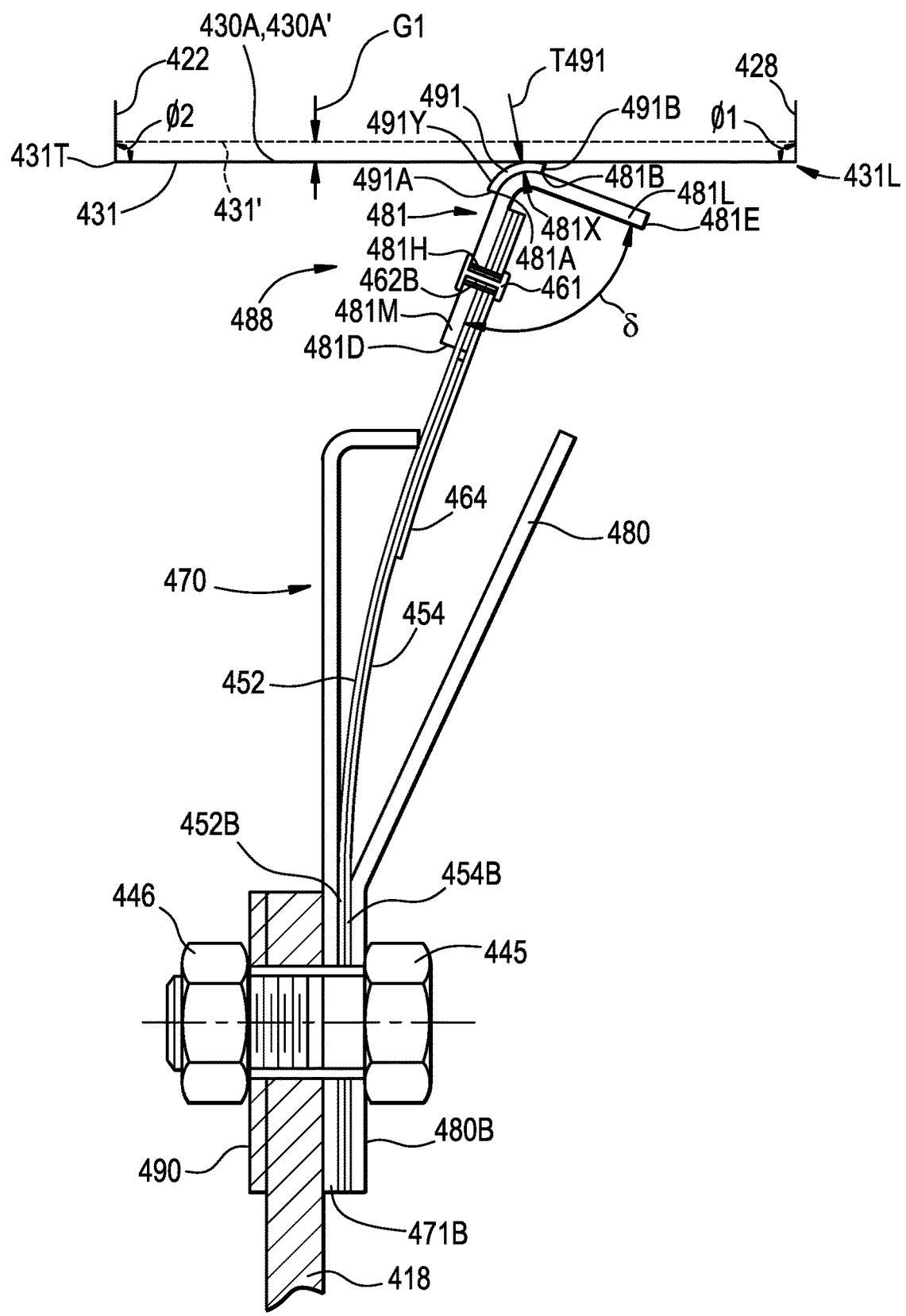
FIG. 14 is a cross sectional view of the seal assembly of FIG. 13 taken across line 14-14 of FIG. 13.

Referring to FIGS. 13 and 14, a seal 440 is similar to the seal 140 of FIGS. 3-8, thus similar elements are designated with similar reference numbers preceded by the number 4. The seal 440 illustrated in FIGS. 13 and 14 includes a first leaf 452 having a base section 452B. The base section 452B defines a fastening area for securing the first leaf 452 to a diaphragm of the preheater 10. The first leaf 452 has an elongate section extending away from the base section 452B and terminating at a distal end 452D thereof.

Each of the seal assemblies 440 includes a plurality of wear resistant members 488 secured to the first leaf 452 and the supplemental leaf assembly 460 via suitable fastening structures 461 such as rivets or spot welds. While each of the plurality of wear resistant members 488 are shown and described as being secured to the first leaf 452 and the supplemental leaf assembly 460, the present invention is not limited in this regard as the each of the plurality of wear resistant members 488 may be secured directly to the first leaf 452, with the first leaf 452 independently being secured to a portion of the supplemental leaf assembly 460. Adjacent seal assemblies 440 including the wear resistant members 488 are spaced apart from one another (e.g., radially segmented) by a gap G88 to allow the seal assemblies 440 to bend. For example, three seal assemblies 440 are shown adjacent to one another and spaced apart by the gap G88. However, the present invention is not limited in this regard as any number of seal assemblies 440 may be employed and spaced apart from one another by the gaps G88. The supplemental leaf assembly 460 is secured to the first leaf 452 by the fastening structures 461 and slidingly engages the second leaf 454. The supplemental leaf assembly 460 includes a spacer 462 (e.g., a spacer leaf) secured to (e.g., via the fastening structures 461) the first leaf 452. The spacer 462 defines a distal end 462D. The supplemental leaf assembly 460 includes a third leaf 464 secured to (e.g., via the fastening structures 461) the spacer 462. The third leaf 464 slidingly engages a portion of the second leaf 454. The third leaf 464 defines a third distal end 464D. The spacer 462 is positioned between the first leaf 452 and the third leaf 464. The spacer 462 is spaced apart from the second distal end 454D thereby defining a gap G between the spacer 462 and the second distal end 454D to accommodate movement of the spacer 462 relative to the second distal end 454D.

As shown in FIGS. 13 and 14, the wear resistant member 488 is defined by a plurality of elongate strips 481 (e.g., ten wear resistant members 488 shown by way of example). Each of the elongate strips 481 has an angled cross section, such as, but not limited to an L-shaped cross section. While the elongate strip 481 is shown and described as having an angled cross section such as an L-shaped cross section, other cross sections may be employed including but not limited to arcuate and J-shaped cross sections. As shown in FIG. 13, the plurality of elongate strips 481 collectively extend an entire length of the seal 440.

As best shown in FIG. 14, the elongate strip 481 has a mounting leg 481M, a bend 481X extending from the mounting leg 481M and a terminal leg 481L extending from the bend 481X. The mounting leg 481M has a plurality of holes 481H extending therethrough. One of the fastening structures 461 extends through each of the holes 481. A spacer sleeve 462B is positioned in each of the holes 461H and around the fastening structure 461 to limit compression between the first leaf 452 and the supplemental leaf assembly 460. The bend 481X extends from the mounting leg 481M at an angle δ (e.g., shown as a 90 degree angle). The bend 481X extends a length from point 481A to point 481B. While an angle of 90 degrees is shown and described, the present invention is not limited in this regard as other angles may be employed including but not limited to angles less than 90 degrees (e.g., 89-85 degrees, 89-80 degrees, 89-70 degrees, 89 to 45 degrees or smaller angles) or angles greater than 90 degrees (e.g., 91-95 degrees, 91-100 degrees, 91-110 degrees, 91-120 degrees of greater angles). In one embodiment the elongate strip 481 is manufactured from a steel alloy.

As best shown in FIG. 14, a wear resistant material 491 is applied to the bend 481X. The wear resistant material 491 extends from a first end 491A to a second end 491B thereof along the bend 481X. The bend 481X provides ample surface area for applying an optimum amount of the wear resistant material to achieve adequate bonding and minimize the cost by not applying the wear resistant material to the entire elongate strip 481. In one embodiment, the wear resistant material 491 is a powder coating such as those supplied by Aegis Industrial Finishing Ltd. of Surrey, Canada. In one embodiment, the wear resistant material 491 is hardfacing weldment such as a cobalt based weld alloy (e.g., Stellite®, a registered trademark of Kennametal, Inc. of Latrobe, Pa.). In one embodiment, the wear resistant material 491 is a replaceable wear resistant strip adhered to the bend 481X. In one embodiment, the wear resistant material 491 is a composite structure with multiple layers including a fabric layer impregnated with wear resistant particles. In one embodiment, the wear resistant material 491 is a case hardened area, such as via nitriding or carburizing.

As shown in FIG. 14, a portion of an outer surface 491Y of the wear resistant material 491 of each wear resistant element 488 slidingly engages the surface 31 of the sector plate 30A during reduced (e.g., 30 percent load or less) or zero load operation. A portion of an outer surface 491Y of the wear resistant material 491 of each wear resistant element 488 of another seal assembly 440, positioned on an opposite side of the diaphragm 418, slidingly engages the surface 31 of the sector plate 30B. For loads greater than 30 percent the outer surface 491Y of the wear resistant material 491 of each wear resistant element 488 is spaced apart from the surface 31' of the sector plate 30A by a gap G1 that reduces hot end radial seal gap by fifty percent at full load compared to the prior art seal assemblies 40.

Figure 2:
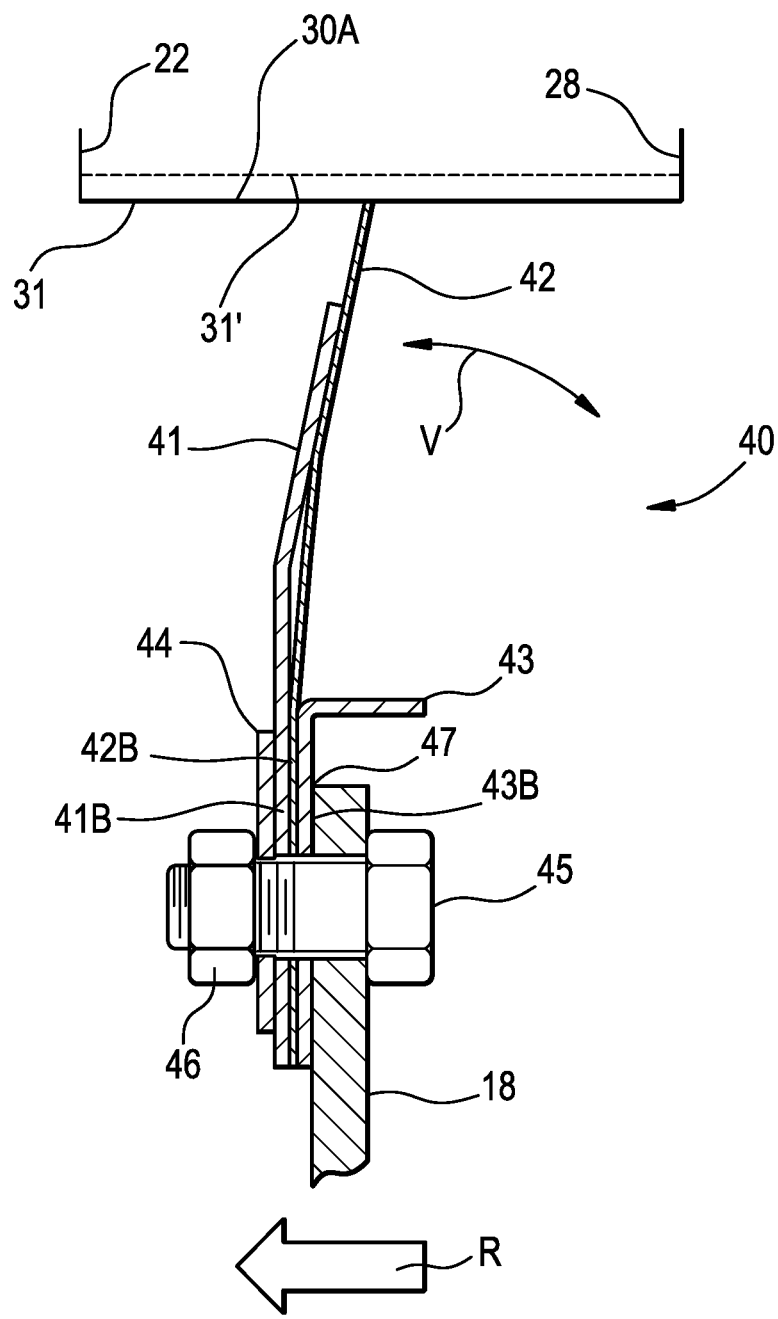
FIG. 2 is a cross sectional view of a prior art seal secured to a diaphragm of a preheater.
Figure 15:
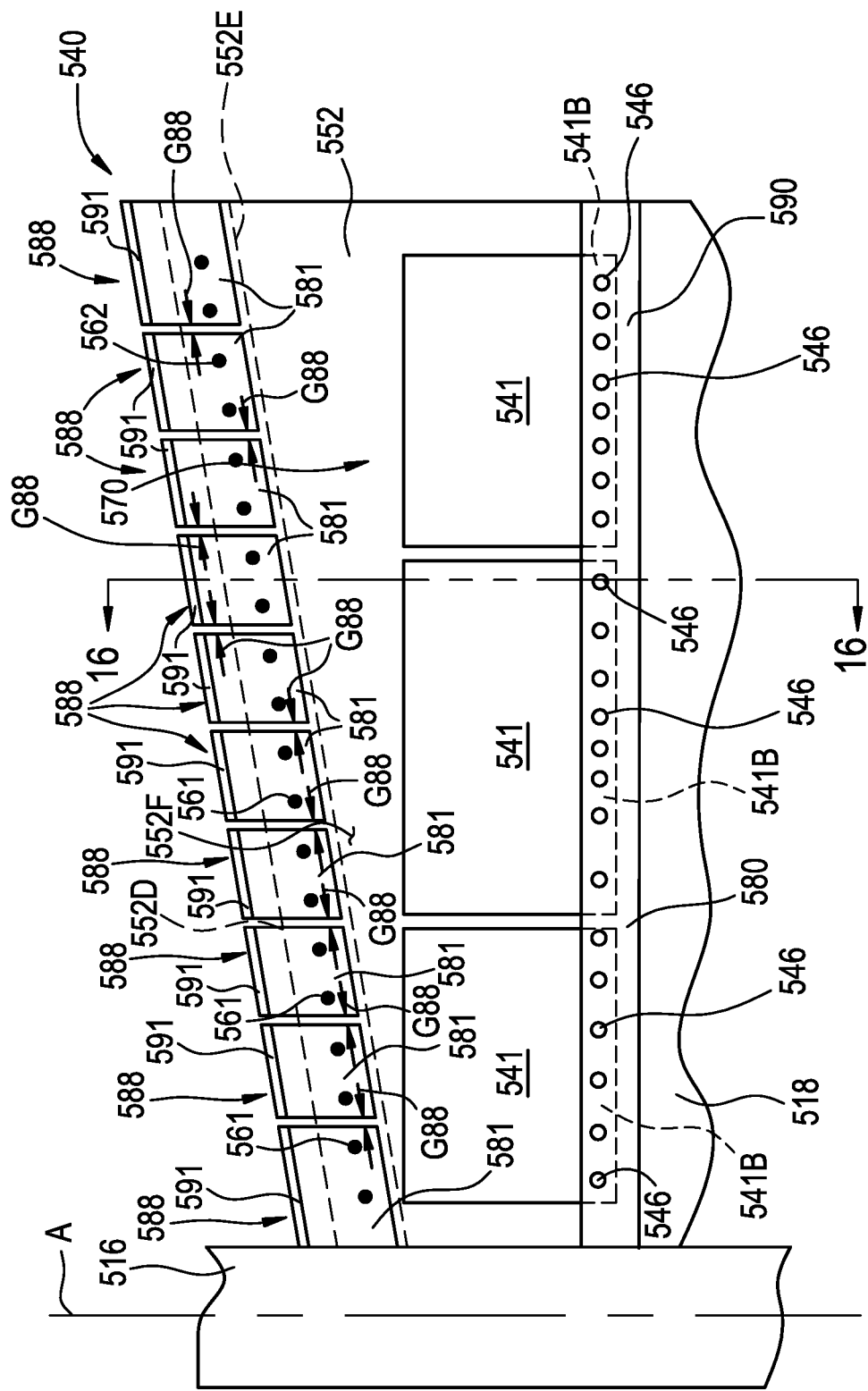
FIG. 15 is a plan view of another embodiment of the seal assembly of the present invention with a wear tip and wear coating, viewed from a leading side of the diaphragm.
Figure 16:
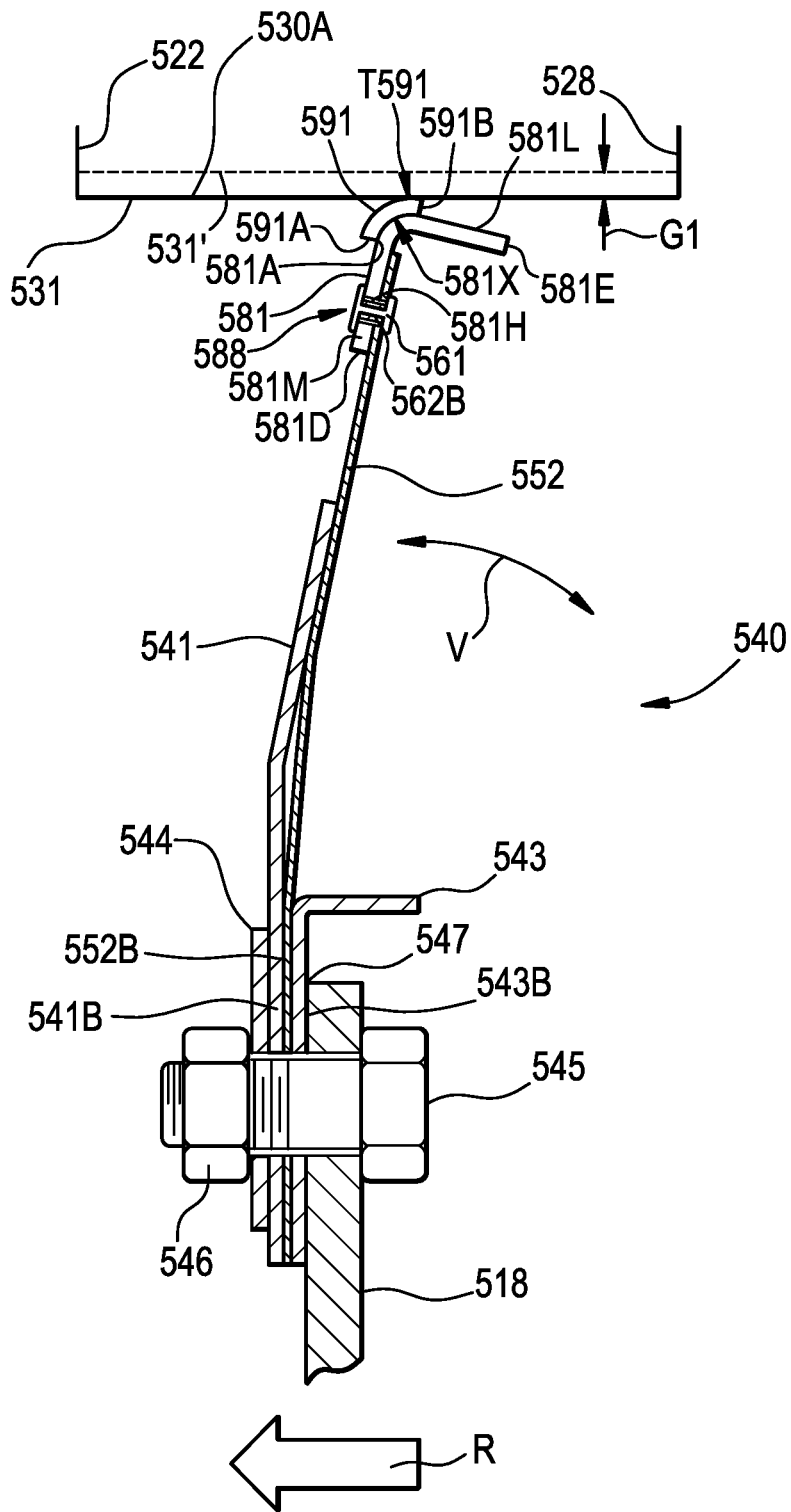
FIG. 16 is a cross sectional view of the seal assembly of FIG. 15 taken across line 16-16 of FIG. 15.

As shown in FIGS. 15 and 16, the three seal assemblies 540 are similar to the seal assemblies 40 shown in FIG. 2 but with the addition of a wear resistant member 588, as described herein. Thus, similar elements are designated with similar reference numbers preceded by the number 5. The seal assemblies 540 extends axially from (i.e., parallel to the axis A) and radially along an edge of each of the diaphragms 518 towards the sector plate 530A in a radially segmented configuration so that each adjacent pair of the seal assemblies 540 are spaced apart from one another by the gap G88. Another set of three seal assemblies 540 extend axially from and radially along an opposite side of each of the diaphragms 518 towards the sector plate 530B (only one seal 540 shown in FIG. 1). The seal 540 includes a flexible seal leaf 552 having a base portion 552B that is positioned between an L-shaped backing bar 543 and an elongate holding bar 541. For each of the seal assemblies 540, a base portion 541B of the holding bar 541, the base portion 552B of the flexible seal leaf 552 and a base portion 543B of the backing bar 543 are secured by a plurality of bolts 545 and nuts 546 between a spacer bar 544 and the diaphragm 518, radially along a length of the diaphragm 518.

As shown in FIGS. 15 and 16, the flexible seal leaf 552 has a plurality of holes 552H extending therethrough. A plurality of wear resistant members 588 are secured to the flexible seal leaf 552 via suitable fastening structures 461 such as rivets or spot welds that extend through the holes 552H. Adjacent wear resistant members 588 are spaced apart from one another by a gap G88 to allow the seal 540 to bend. Each of the wear resistant members 588 are configured and manufactured similar to the wear resistant members 488 described herein.

As shown in FIG. 15, the a portion of an outer surface 591Y of the wear resistant material 591 of each wear resistant element 588 slidingly engages the surface 31 of the sector plate 30A during reduced (e.g., 30 percent load or less) or zero load operation. A portion of an outer surface 591Y of the wear resistant material 591 of each wear resistant element 588 of another seal assembly 540, positioned on an opposite side of the diaphragm 518, slidingly engages the surface 31 of the sector plate 30B. For loads greater than 30 percent the outer surface 591Y of the wear resistant material 591 of each wear resistant element 588 is spaced apart from the surface 31' of the sector plate 30A by a gap G1.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A seal assembly for a rotary preheater, the seal assembly comprising:
   at least one leaf having a base section, the base section defining a fastening area for securing the at least one leaf to a diaphragm of the preheater, the at least one leaf having an elongate section extending away from the base section and terminating at a distal end thereof; and
   at least one wear resistant member being secured to the at least one leaf proximate the distal end thereof,
   wherein each of the at least one wear resistant members comprises a plurality of elongate strips, each of the plurality of elongate strips comprising a bend having a wear resistant material applied thereto.

2. The seal assembly of claim 1, wherein each of the plurality of elongate strips comprises a mounting leg and a terminal leg, wherein the bend extends between the mounting leg and the terminal leg at a non-zero angle.

3. The seal assembly of claim 2, wherein the non-zero angle is less than 90°.

4. The seal assembly of claim 2, wherein the non-zero angle is 90° or greater.

5. The seal assembly of claim 2, wherein the mounting leg comprises at least one hole extending through the mounting leg.

6. The seal assembly of claim 5, further comprising a plurality of fastening structures, wherein one of the plurality of fastening structures extends through the hole to the fastening area of the at least one leaf, thereby securing the mounting leg to the at least one leaf.

7. The seal assembly of claim 1, further comprising a wear resistant material applied to at least a portion of the bend.

8. The seal assembly of claim 7, wherein the wear resistant material is applied from a first end of the bend to a second end of the bend.

9. The seal assembly of claim 8, wherein an outer surface of the wear resistant material slidingly engages a surface of a sector plate during reduced or zero load operation.

10. The seal assembly of claim 8, wherein an outer surface of the wear resistant material is spaced apart from a surface of a sector plate by a gap.

11. The seal assembly of claim 7, wherein the wear resistant material is selected from the group consisting of: a powder coating, a hardfacing weldment, a replacement wear strip adhered to the bend, a composite structure, and a case hardened area.

12. The seal assembly of claim 11, wherein the composite structure comprises at least one fabric layer impregnated with wear resistant particles.

13. The seal assembly of claim 1, wherein each of the plurality of elongate strips is manufactured from a steel alloy.

14. A method of securing at least one wear resistant member to a seal assembly according to claim 1, the method comprising:
   positioning a wear resistant member adjacent to at least one leaf of the seal assembly;
   extending at least one hole through the wear resistant member;
   positioning a fastening area on the adjacent at least one leaf; and
   inserting a fastening structure through each of the at least one hole through the wear resistant member to the fastening area of the adjacent at least one leaf, thereby securing the at least one wear resistant member to the seal assembly.

15. The method of claim 14, wherein the fastening structure is selected from the group consisting of rivets or spot welds.

16. A preheater assembly comprising:
- a rotor assembly rotatably mounted on a rotor post and disposed in a housing, the rotor assembly defining diaphragms extending radially from the rotor post to an outer periphery of the rotor assembly, adjacent pairs of the diaphragms defining respective compartments for receiving a heat transfer assembly, each of the heat transfer assemblies including a plurality of heat transfer sheets stacked upon one another, the housing including a flue gas inlet duct and a flue gas outlet duct for channeling the flow of heated flue gases through the preheater, the housing including an air inlet duct and an air outlet duct for channeling the flow of combustion air through the preheater, the preheater including an upper sector plate extending across the housing adjacent to an upper face of the rotor assembly and a lower sector plate extending across the housing adjacent to lower face of the rotor assembly, the upper sector plate extends between and is joined to the flue gas inlet duct and the air outlet duct, the lower sector plate extends between and is joined to the flue gas outlet duct and the air inlet duct, the upper and lower sector plates, respectively, are joined to one another by a circumferential plate;
- at least one of the upper sector plate and the lower sector plate defining a leading edge and a trailing edge, and wherein at least one of the leading edge and the trailing edge defines a ramped configuration; and
- the seal assembly of claim 1 being positioned on an axial edge of each diaphragm; and
- wherein a portion of the seal assembly engages the leading edge and disengages the trailing edge.

* * * * *